(12) United States Patent
Lee (10) Patent No.: US 9,066,225 B2
(45) Date of Patent: Jun. 23, 2015

(54) NETWORK SELECTION SCHEME (75) Inventor: Hyoung-Gon Lee, Seoul (KR)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 13/989,720

(22) PCT Filed: Apr. 24, 2012

(86) PCT No.: PCT/KR2012/003134
§ 371 (c)(1),
(2), (4) Date: May 24, 2013

(87) PCT Pub. No.: WO2013/162085
PCT Pub. Date: Oct. 31, 2013

(65) Prior Publication Data
US 2014/0112193 A1    Apr. 24, 2014

(51) Int. Cl.
*H04W 4/00* (2009.01)
*H04W 12/02* (2009.01)
*H04W 48/18* (2009.01)
*H04L 29/06* (2006.01)
*H04W 84/10* (2009.01)
*H04W 12/08* (2009.01)
*H04W 72/10* (2009.01)
*H04W 72/06* (2009.01)

(52) U.S. Cl.
CPC .............. *H04W 12/02* (2013.01); *H04W 48/18* (2013.01); *H04L 63/18* (2013.01); *H04W 84/10* (2013.01); *H04W 12/08* (2013.01); *H04W 72/10* (2013.01); *H04W 72/06* (2013.01)

(58) Field of Classification Search
None
See application file for complete search history.

(56) References Cited

U.S. PATENT DOCUMENTS

| 2007/0032234 A1 | 2/2007 | Jain |
| 2009/0007246 A1* | 1/2009 | Gutowski et al. ................ 726/6 |
| 2009/0109898 A1* | 4/2009 | Adams et al. ................. 370/328 |
| 2009/0201846 A1 | 8/2009 | Horn |
| 2010/0130170 A1* | 5/2010 | Liu et al. ........................ 455/411 |
| 2010/0178919 A1* | 7/2010 | Deepak et al. ............. 455/435.2 |
| 2011/0044240 A1 | 2/2011 | Jang |
| 2011/0151924 A1* | 6/2011 | Miller ........................ 455/552.1 |
| 2011/0216717 A1* | 9/2011 | Zhu ................................ 370/329 |
| 2011/0310851 A1* | 12/2011 | Klingenbrunn et al. ...... 370/332 |
| 2012/0039262 A1* | 2/2012 | Walsh ........................... 370/329 |
| 2012/0077483 A1* | 3/2012 | Abraham et al. .......... 455/422.1 |
| 2013/0039275 A1* | 2/2013 | Patil et al. .................... 370/328 |
| 2013/0238807 A1* | 9/2013 | Wakikawa et al. ............ 709/227 |

FOREIGN PATENT DOCUMENTS

WO   2011062531 A1   5/2011

OTHER PUBLICATIONS

International Search Report and Written Opinion from International Application No. PCT/KR2012/003134 mailed Dec. 20, 2012.
Patrick Mandic, "Service-oriented Network Selection" IEEE International Symposium on Wireless Communication Systems, pp. 138-143, 2008.

* cited by examiner

*Primary Examiner* — Bob Phunkulh
(74) *Attorney, Agent, or Firm* — Brundidge & Stanger, P.C.

(57) ABSTRACT

Technologies are generally described for a network selection scheme for an electronic device. In some examples, a method performed under control of an electronic device may include searching one or more communication networks available for the electronic device; determining types of the searched communication networks; determining a type of data traffic to be transmitted over at least one of the searched communication networks; and determining at least one of the communication networks to be used for the data traffic based at least in part on the determined types of the communication networks and the determined type of the data traffic.

18 Claims, 4 Drawing Sheets

NETWORK SELECTION SCHEME

CROSS-REFERENCE TO RELATED APPLICATIONS

This Application is the National Stage filing under 35 U.S.C. §371 of PCT Application Ser. No. PCT/KR12/03134 filed on Apr. 24, 2012.

BACKGROUND ART

The availability of mobile telecommunications networks, such as third generation (3G) and fourth generation (4G) mobile telecommunications networks, and wireless local area networks, such as Wi-Fi networks, makes it possible to provide wireless communications for end user devices. Users generally tend to use the wireless local area networks, such as Wi-Fi networks, for data transmission because the wireless local area networks are typically available at lower cost but with higher throughput than the mobile telecommunications networks. However, the users sometimes tend to use the mobile telecommunications networks due to a security issue even when the wireless local area networks are available. In this regard, the users frequently change the connection between the mobile telecommunications networks and the wireless local area networks, causing inconvenience to the users.

DISCLOSURE OF INVENTION

In an example, a method performed under control of an electronic device may include searching one or more communication networks available for the electronic device; determining types of the searched communication networks; determining a type of data traffic to be transmitted over at least one of the searched communication networks; and determining at least one of the communication networks to be used for the data traffic based at least in part on the determined types of the communication networks and the determined type of the data traffic.

In another example, a network selection system may include a network type determination unit configured to determine network types of one or more communication networks available for an electronic device; a traffic type determination unit configured to determine a traffic type of data traffic to be transmitted over at least one of the communication networks; and a network selection unit configured to select at least one of the communication networks to be used for the data traffic based at least in part on the network types determined by the network type determination unit and the traffic type determined by the traffic type determination unit.

In yet another example, a computer-readable storage medium may store thereon computer-executable instructions that, in response to execution, cause a network selection system to perform operations, including determining types of one or more communication networks available for an electronic device; determining a type of data traffic to be transmitted over at least one of the communication networks; and determining at least one of the communication networks to be used for the data traffic based at least in part on the determined types of the communication networks and the determined type of the data traffic.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The foregoing and other features of this disclosure will become more apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

MODE OF THE INVENTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the drawings, can be arranged, substituted, combined, separated, and designed in a wide variety of different configurations, all of which are explicitly contemplated herein.

This disclosure is generally drawn, inter alia, to methods, apparatuses, systems, devices, and computer program products related to a network selection scheme for an electronic device.

Technologies are generally described for a network selection scheme for selecting, among one or more communication networks available for an electronic device, at least one of the communication networks to be used for transmitting data traffic, based at least in part on network types of the communication networks and/or a traffic type of the data traffic. Examples of the electronic device may include, but are not limited to, a mobile phone, a smartphone, a personal digital assistant (PDA), a tablet, a laptop computer, a desktop computer, or any other devices having communication capability relative to other devices.

In some examples, a network selection system, which may be a component of the electronic device or separate from the electronic device but controlled by the electronic device, may determine the network types of the one or more communication networks available for the electronic device, and determine the traffic type of the data traffic to be transmitted over at least one of the communication networks. Then, the network selection system may select at least one of the communication networks to be used for the data traffic based at least in part on the network types and/or the traffic type.

In some examples, the network selection system may determine the network types based at least in part on security levels and/or fee rates of the communication networks. In some examples, the network selection system may determine the traffic type based at least in part on a security-sensitivity and/or a cost-sensitivity of the data traffic.

In some examples, the network selection system may select at least one of the communication networks whose security level is high and fee rate is low for transmitting the data traffic with high security-sensitivity and high cost-sensitivity. In some examples, the network selection system may select at least one of the communication networks whose security level is high for transmitting the data traffic with high security-sensitivity but low cost-sensitivity. In some examples, the network selection system may select at least one of the communication networks whose fee rate is low for transmitting the data traffic with high cost-sensitivity but low security-sensitivity.

Figure 1:
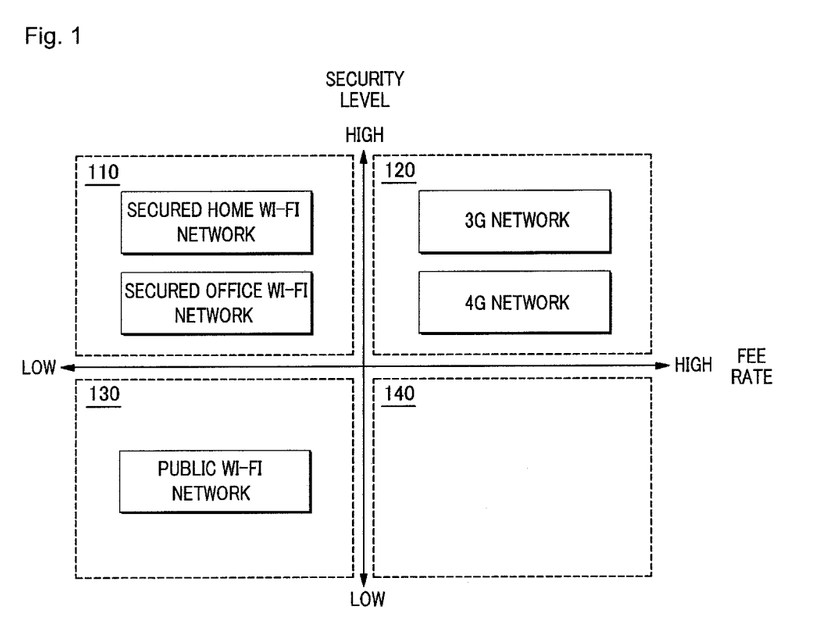
FIG. 1 schematically shows types of communication networks determined based at least in part on security levels and fee rates of the communication networks, arranged in accordance with at least some embodiments described herein.

FIG. 1 schematically shows types of communication networks determined based at least in part on security levels and fee rates of the communication networks, arranged in accordance with at least some embodiments described herein.

As depicted in FIG. 1, the communication networks may be categorized into one or more groups based at least in part on the security levels and the fee rates of the respective communication networks. In some embodiments, the communication networks may be categorized into four groups including a high-security low-cost group 110, a high-security high-cost group 120, a low-security low-cost group 130, and a low-security high-cost group 140.

By way of example, but not limitation, the communication networks of high-security low-cost group 110 may include a secured wireless local area network, such as a secured home Wi-Fi network, a secured office Wi-Fi network, etc. By way of example, but not limitation, the communication networks of high-security high-cost group 120 may include a mobile telecommunications network, such as a third generation (3G) mobile telecommunications network and a fourth generation (4G) mobile telecommunications network, etc. By way of example, but not limitation, the communication networks of low-security low-cost group 130 may include a public wireless local area network, such as a public, i.e., openly-shared, Wi-Fi network, etc.

Figure 2:
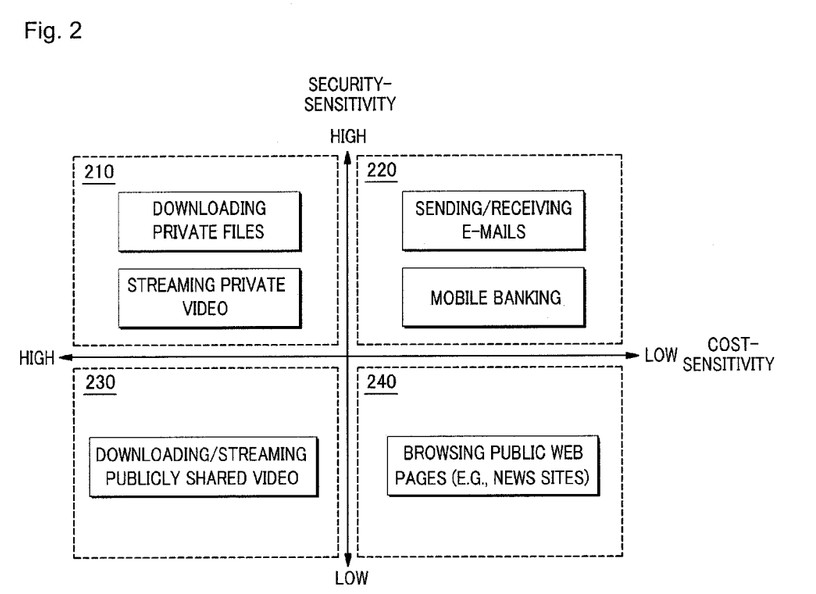
FIG. 2 schematically shows types of data traffics determined based at least in part on a security-sensitivity and a cost-sensitivity of the data traffic, arranged in accordance with at least some embodiments described herein.

FIG. 2 schematically shows types of data traffics determined based at least in part on a security-sensitivity and a cost-sensitivity of the data traffic, arranged in accordance with at least some embodiments described herein.

As depicted in FIG. 2, the types of data traffics may be categorized into one or more groups based at least in part on the security-sensitivity and the cost-sensitivity of the data traffic. In some embodiments, the types of data traffics may be categorized into four groups including a highly-security-sensitive highly-cost-sensitive traffic 210, a highly-security-sensitive less-cost-sensitive traffic 220, a less-security-sensitive highly-cost-sensitive traffic 230, and a less-security-sensitive less-cost-sensitive traffic 240.

By way of example, but not limitation, the data traffics associated with uploading or downloading personal or private files, or streaming personal or private video, etc. may be categorized into highly-security-sensitive highly-cost-sensitive traffic 210, since such traffics may require high level of security and cause concerns about cost due to the large volume of the traffic. By way of example, but not limitation, the data traffics associated with sending or receiving e-mails, or mobile banking, etc. may be categorized into highly-security-sensitive less-cost-sensitive traffic 220, since such traffics may require high level of security but cause little concerns about cost. By way of example, but not limitation, the data traffics associated with downloading or streaming publicly shared video, etc. may be categorized into less-security-sensitive highly-cost-sensitive traffic 230, since such traffics may require low level of security but cause concerns about cost. By way of example, but not limitation, the data traffics associated with browsing public web pages, such as a news site, etc. may be categorized into less-security-sensitive less-cost-sensitive traffic 240, since such traffics may require low level of security and cause little concerns about cost.

In some embodiments, a network selection system, which may be a component of an electronic device or separate from the electronic device but controlled by the electronic device, may classify the network type of each of the communication networks available for the electronic device into one of the four groups illustrated in FIG. 1 (i.e., high-security low-cost group 110, high-security high-cost group 120, low-security low-cost group 130, and low-security high-cost group 140), and determine the traffic type of the data traffic to be transmitted over at least one of the communication networks as one of the four types illustrated in FIG. 2 (i.e., highly-security-sensitive highly-cost-sensitive traffic 210, highly-security-sensitive less-cost-sensitive traffic 220, less-security-sensitive highly-cost-sensitive traffic 230, and less-security-sensitive less-cost-sensitive traffic 240).

Then, in some embodiments, the network selection system may select at least one of the communication networks to be used for transmitting the data traffic based at least in part on the network types and/or the traffic type. By way of example, but not limitation, the network selection system may select or determine at least one of the communication networks classified into high-security low-cost group 110 to be used for transmitting the data traffic classified into highly-security-sensitive highly-cost-sensitive traffic 210. By way of example, but not limitation, the network selection system may select or determine at least one of the communication networks classified into high-security low-cost group 110 or high-security high-cost group 120 to be used for transmitting the data traffic classified into highly-security-sensitive less-cost-sensitive traffic 220. By way of example, but not limitation, the network selection system may select or determine at least one of the communication networks classified into high-security low-cost group 110 or low-security low-cost group 130 to be used for transmitting the data traffic classified into less-security-sensitive highly-cost-sensitive traffic 230. By way of example, but not limitation, the network selection system may select or determine any one of the communication networks to be used for transmitting the data traffic classified into less-security-sensitive less-cost-sensitive traffic 240.

In some embodiments, in cases where there is no available communication network appropriate or desirable for the data traffic, the network selection system may provide a notification so that a user may select one of the available but not desirable communication networks for transmitting the data traffic. By way of example, but not limitation, in cases where only a third generation (3G) mobile telecommunications network is available for the electronic device, but the user runs an application for streaming a publicly shared video, which may incur a considerable cost due to the large volume of the traffic, the network selection system may provide a notification window asking the user whether he/she wants to stream the video via the 3G mobile telecommunications network.

Figure 3:
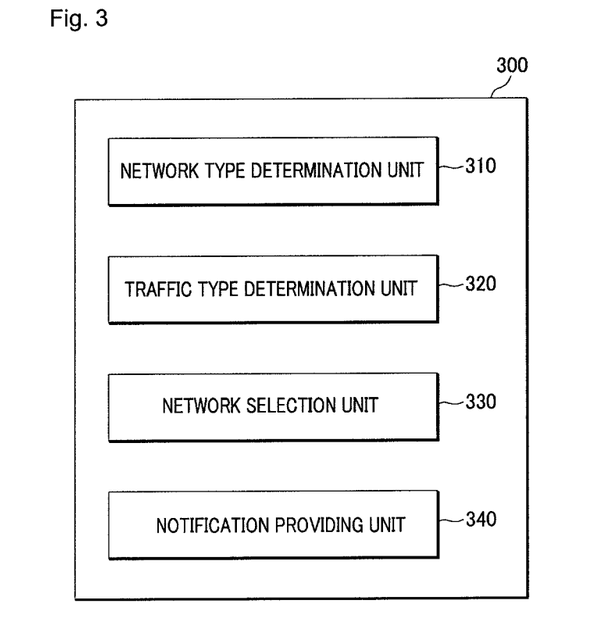
FIG. 3 shows a schematic block diagram illustrating an example architecture for providing a network selection scheme for an electronic device, arranged in accordance with at least some embodiments described herein.

FIG. 3 shows a schematic block diagram illustrating an example architecture for providing a network selection scheme for an electronic device, arranged in accordance with at least some embodiments described herein.

As depicted, a network selection system 300 may include a network type determination unit 310, a traffic type determination unit 320, a network selection unit 330, and a notification providing unit 340. Although illustrated as discrete components, various components may be divided into additional components, combined into fewer components, or eliminated altogether while being contemplated within the scope of the disclosed subject matter.

Network type determination unit 310 may be configured to determine network types of one or more communication networks available for an electronic device. In some embodiments, network type determination unit 310 may determine the network types based at least in part on security levels and/or fee rates of the respective communication networks. In some embodiments, network type determination unit 310 may determine the network types as one of the four types illustrated in FIG. 1 (i.e., network types classified into high-security low-cost group 110, high-security high-cost group 120, low-security low-cost group 130, and low-security high-cost group 140).

Traffic type determination unit 320 may be configured to determine a traffic type of data traffic to be transmitted over at least one of the communication networks. In some embodiments, traffic type determination unit 320 may determine the traffic type based at least in part on a security-sensitivity and/or a cost-sensitivity of the data traffic. In some embodiments, traffic type determination unit 320 may determine the traffic type as one of the four types illustrated in FIG. 2 (i.e., highly-security-sensitive highly-cost-sensitive traffic 210, highly-security-sensitive less-cost-sensitive traffic 220, less-security-sensitive highly-cost-sensitive traffic 230, and less-security-sensitive less-cost-sensitive traffic 240).

In some embodiments, traffic type determination unit 320 may determine the traffic type based at least in part on an application run on the electronic device. By way of example, but not limitation, when a mobile banking application or an e-mail application is activated or run on the electronic device, traffic type determination unit 320 may determine the traffic type as a highly-security-sensitive less-cost-sensitive traffic. By way of example, but not limitation, when a video-sharing application such as YouTube application is activated or run on the electronic device, traffic type determination unit 320 may determine the traffic type as a less-security-sensitive highly-cost-sensitive traffic.

In alternative embodiments, traffic type determination unit 320 may determine the traffic type based at least in part on a port used for the data traffic. By way of example, but not limitation, when a secure session, for example, being associated with Hypertext Transfer Protocol (HTTPS), is established, Port 443 is used. In such cases, i.e., in cases where Port 443 is used, traffic type determination unit 320 may determine the traffic type as a highly-security-sensitive traffic.

In yet alternative embodiments, traffic type determination unit 320 may determine the traffic type based at least in part on an input from a user of the electronic device, or a device setting predetermined by a manufacturer of the electronic device.

Network selection unit 330 may be configured to select at least one of the communication networks to be used for the data traffic based at least in part on the network types determined by network type determination unit 310 and the traffic type determined by traffic type determination unit 320. In some embodiments, network selection unit 330 may select at least one of the communication networks whose security level is high and fee rate is low for transmitting the data traffic with high security-sensitivity and high cost-sensitivity. In some embodiments, network selection unit 330 may select at least one of the communication networks whose security level is high for transmitting the data traffic with high security-sensitivity and low cost-sensitivity. In some embodiments, network selection unit 330 may select at least one of the communication networks whose fee rate is low for transmitting the data traffic with low security-sensitivity and high cost-sensitivity.

Notification providing unit 340 may be configured to provide a notification, if there is no available network type appropriate or desirable for the traffic type. By way of example, but not limitation, in cases where only a third generation (3G) mobile telecommunications network is available for the electronic device, but the user activates or runs an application for streaming a publicly shared video, which may incur a considerable cost due to the large volume of the traffic, notification providing unit 340 may provide a notification asking the user whether he/she wants to stream the video via the 3G mobile telecommunications network.

By employing network selection system 300 as shown in FIG. 3, the electronic device may select appropriate or desirable communication networks with causing little or no inconvenience to the user.

Figure 4:
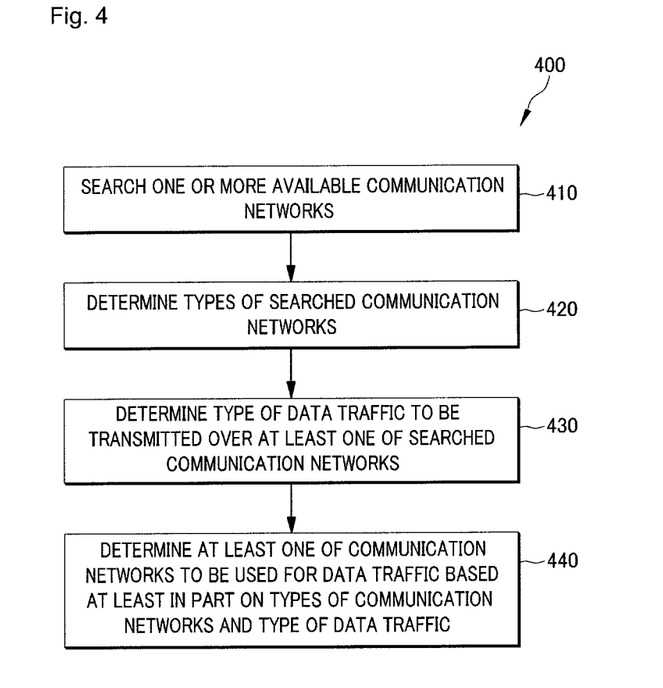
FIG. 4 shows an example flow diagram of a process for providing a network selection scheme for an electronic device, arranged in accordance with at least some embodiments described herein.

FIG. 4 shows an example flow diagram of a process for providing a network selection scheme for an electronic device, arranged in accordance with at least some embodiments described herein.

The process in FIG. 4 may be implemented in a network selection system such as network selection system 300 including network type determination unit 310, traffic type determination unit 320, network selection unit 330 and notification providing unit 340 described above. An example process 400 may include one or more operations, actions, or functions as illustrated by one or more blocks 410, 420, 430 and/or 440. Although illustrated as discrete blocks, various blocks may be divided into additional blocks, combined into fewer blocks, or eliminated, depending on the desired implementation. Processing may begin at block 410.

At block 410, the network selection system may search one or more communication networks available for the electronic device. By way of example, but not limitation, the communication networks may include a mobile telecommunications network, such as a third generation (3G) or fourth generation (4G) mobile telecommunications network, a secured wireless local area network, such as a secured home Wi-Fi network, a secured office Wi-Fi network, and/or a public wireless local area network, such as a public Wi-Fi network, etc. Processing may continue from block 410 to block 420.

At block 420, the network selection system may determine network types of the searched communication networks. In some embodiments, the network selection system may determine the network types based at least in part on security levels and/or fee rates of the respective communication networks. In some embodiments, the network selection system may classify the respective communication networks into one of a high-security low-cost group, a high-security high-cost group, a low-security low-cost group and a low-security high-cost group. By way of example, but not limitation, the communication networks classified into the high-security high-cost group may include mobile telecommunications networks, the communication networks classified into the high-security low-cost group may include secured wireless local area networks, and the communication networks classified into the low-security low-cost group may include public wireless local area networks. Processing may continue from block 420 to block 430.

At block 430, the network selection system may determine a traffic type of data traffic to be transmitted over at least one of the searched communication networks. In some embodiments, the network selection system may determine the traffic type based at least in part on a security-sensitivity and/or a cost-sensitivity of the data traffic. In some embodiments, the network selection system may classify the data traffic into one of a highly-security-sensitive highly-cost-sensitive traffic, a highly-security-sensitive less-cost-sensitive traffic, a less-security-sensitive highly-cost-sensitive traffic and a less-security-sensitive less-cost-sensitive traffic.

In some embodiments, the network selection system may determine the traffic type based at least in part on an application run on the electronic device. In alternative embodiments, the network selection system may determine the traffic type based at least in part on a port used for the data traffic. In yet alternative embodiments, the network selection system may determine the traffic type based at least in part on an input from a user of the electronic device, or a device setting predetermined by a manufacturer of the electronic device. Processing may continue from block 430 to block 440.

At block 440, the network selection system may determine at least one of the communication networks to be used for the data traffic based at least in part on the network types and/or the traffic type. In some embodiments, the network selection system may determine at least one of the communication networks classified into the high-security low-cost group to be used for the data traffic classified into the highly-security-sensitive highly-cost-sensitive traffic. In some embodiments, the network selection system may determine at least one of the communication networks classified into the high-security low-cost group or the high-security high-cost group to be used for the data traffic classified into the highly-security-sensitive less-cost-sensitive traffic. In some embodiments, the network selection system may determine at least one of the communication networks classified into the high-security low-cost group or the low-security low-cost group to be used for the data traffic classified into the less-security-sensitive highly-cost-sensitive traffic. In some embodiments, the network selection system may determine any one of the communication networks to be used for the data traffic classified into the less-security-sensitive less-cost-sensitive traffic. As such, the electronic device may select appropriate or desirable communication networks with causing little or no inconvenience to the user.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. For example, although not illustrated in FIG. 4, process 400 may include providing a notification if there is no available communication network appropriate or desirable for the data traffic.

Figure 5:
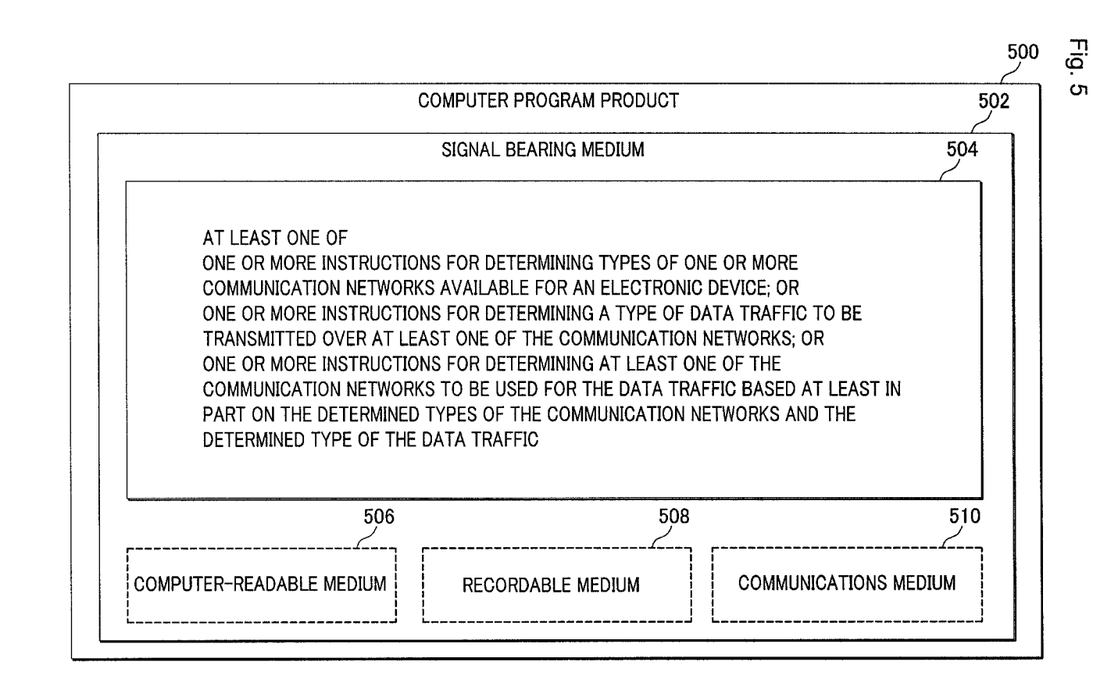
FIG. 5 illustrates example computer program products that may be utilized to provide a network selection scheme for an electronic device, arranged in accordance with at least some embodiments described herein.

FIG. 5 illustrates example computer program products that may be utilized to provide a network selection scheme for an electronic device, arranged in accordance with at least some embodiments described herein.

Program product 500 may include a signal bearing medium 502. Signal bearing medium 502 may include one or more instructions 504 that, when executed by, for example, a processor, may provide the functionality described above with respect to FIGS. 1-4. By way of example, instructions 504 may include: one or more instructions for determining types of one or more communication networks available for an electronic device; one or more instructions for determining a type of data traffic to be transmitted over at least one of the communication networks; one or more instructions for determining at least one of the communication networks to be used for the data traffic based at least in part on the determined types of the communication networks and the determined type of the data traffic. Thus, for example, referring to FIG. 3, network selection system 300 may undertake one or more of the blocks shown in FIG. 4 in response to instructions 504.

In some implementations, signal bearing medium 502 may encompass a computer-readable medium 506, such as, but not limited to, a hard disk drive, a CD, a DVD, a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, program product 500 may be conveyed to one or more modules of network selection system 300 by an RF signal bearing medium 502, where the signal bearing medium 502 is conveyed by a wireless communications medium 510 (e.g., a wireless communications medium conforming with the IEEE 802.11 standard).

Figure 6:
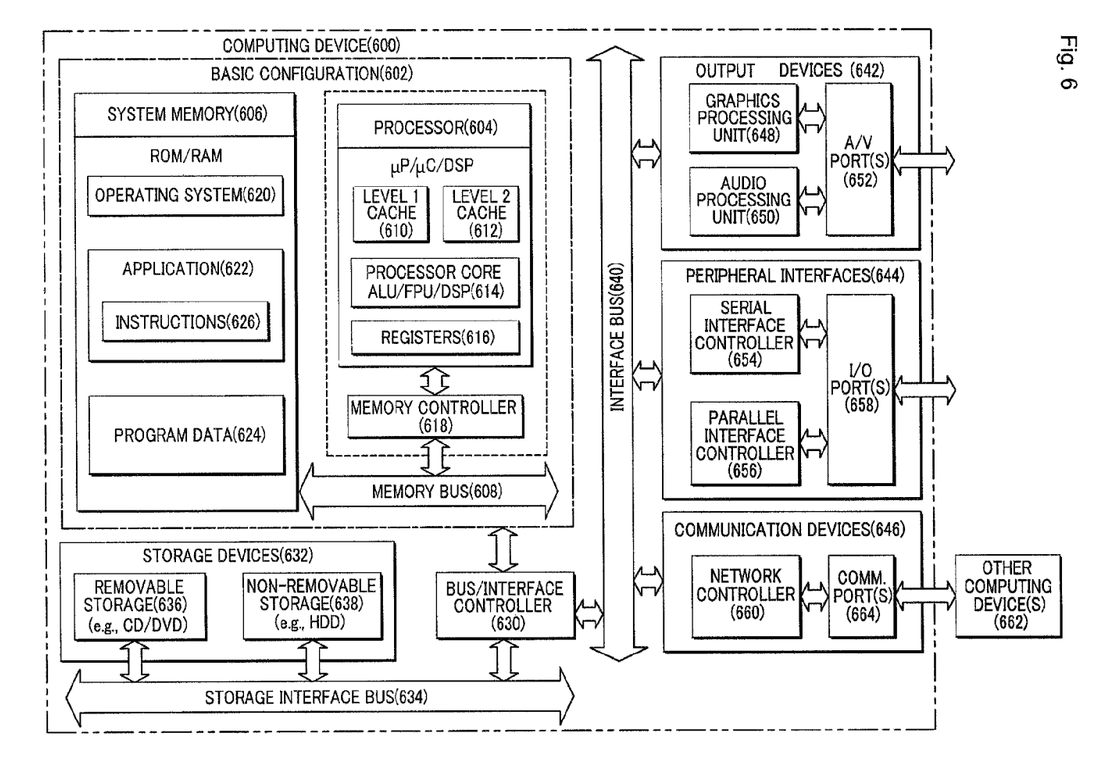
FIG. 6 is a block diagram illustrating an example computing device that may be utilized to provide a network selection scheme for an electronic device, arranged in accordance with at least some embodiments described herein.

FIG. 6 is a block diagram illustrating an example computing device that may be utilized to provide a network selection scheme for an electronic device, arranged in accordance with at least some embodiments described herein.

In these examples, elements of computing device 600 may be arranged or configured for an electronic device, such as, for example, a mobile phone, a smartphone, a personal digital assistant (PDA), a tablet, a laptop computer, a desktop computer. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one or more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include instructions 626 that may be arranged to perform the functions as described herein including the actions described with respect to the network selection system 300 architecture as shown in FIG. 3 or including the actions described with respect to the flow charts shown in FIG. 4. In some examples, application 622 may be arranged to operate with program data 624 on an operating system 620 such that implementations for instructions for a network selection system as described herein.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method performed under control of an electronic device, comprising:
    searching two or more communication networks available for the electronic device;
    determining types of the searched two or more communication networks by classifying the respective communication networks into two or more groups based at least in part on security levels and fee rates of the respective communication networks, wherein each of the two or more groups includes at least two communication networks;
    determining types of data traffics to be transmitted over the respective communication networks of the searched two or more communication networks by classifying the respective data traffics into two or more groups based at least in part on a security-sensitivity, cost-sensitivity of the respective data traffics, and an application running on the electronic device; and
    determining the respective communication networks to be used for the respective data traffics based at least in part on the determined types of the communication networks and the determined types of the data traffics.

2. The method of claim 1, wherein the determining the types of the searched communication networks includes classifying the respective communication networks into one of a high-security low-cost group, a high-security high-cost group, a low-security low-cost group and a low-security high-cost group.

3. The method of claim 2, wherein the determining the types of the data traffics includes classifying the data traffic into one of a highly-security-sensitive highly-cost-sensitive traffic, a highly-security-sensitive less-cost-sensitive traffic, a less-security-sensitive highly-cost-sensitive traffic and a less-security-sensitive less-cost-sensitive traffic.

4. The method of claim 3, wherein the determining the respective communication networks to be used for the respective data traffics includes determining at least one of the communication networks classified into the high-security low-cost group to be used for the data traffic classified into the highly-security-sensitive highly-cost-sensitive traffic.

5. The method of claim 3, wherein the determining the respective communication networks to be used for the respective data traffics includes determining at least one of the communication networks classified into the high-security low-cost group or the high-security high-cost group to be used for the data traffic classified into the highly-security-sensitive less-cost-sensitive traffic.

6. The method of claim 3, wherein the determining the respective communication networks to be used for the respective data traffics includes determining at least one of the communication networks classified into the high-security low-cost group or the low-security low-cost group to be used for the data traffic classified into the less-security-sensitive highly-cost-sensitive traffic.

7. The method of claim 3, wherein the determining the respective communication networks to be used for the respective data traffics includes determining any one of the communication networks to be used for the data traffic classified into the less-security-sensitive less-cost-sensitive traffic.

8. The method of claim 2, wherein the communication networks classified into the high-security high-cost group include mobile telecommunications networks.

9. The method of claim 2, wherein the communication networks classified into the high-security low-cost group include secured wireless local area networks, and the communication networks classified into the low-security low-cost group include public wireless local area networks.

10. The method of claim 1, wherein the determining the types of the data traffics includes determining the type of the data traffic based at least in part on an input from a user of the electronic device.

11. The method of claim 1, wherein the determining the types of the data traffics includes determining the type of the data traffic based at least in part on a port used for the data traffic.

12. A network selection system comprising:
a network type determination unit configured to:
determine network types of two or more communication networks available for an electronic device, and
determine the network types of the two or more communication networks by classifying the respective communication networks into two or more groups based at least in part on security levels and fee rates of the respective communication networks, wherein each of the two or more groups includes at least two communication networks;
a traffic type determination unit configured to:
determine a traffic types of data traffics to be transmitted over the respective communication networks by classifying the respective data traffics into two or more groups based at least in part on a security-sensitivity, cost-sensitivity of the respective data traffics, and an application running on the electronic device; and
a network selection unit configured to select the respective communication networks to be used for the respective data traffics based at least in part on the network types determined by the network type determination unit and the traffic types determined by the traffic type determination unit.

13. The network selection system of claim 12, wherein the network selection unit is further configured to select at least one of the communication networks whose security level is high and fee rate is low for transmitting the data traffic with high security-sensitivity and high cost-sensitivity.

14. The network selection system of claim 12, wherein the network selection unit is further configured to select at least one of the communication networks whose security level is high for transmitting the data traffic with high security-sensitivity and low cost-sensitivity.

15. The network selection system of claim 12, wherein the network selection unit is further configured to select at least one of the communication networks whose fee rate is low for transmitting the data traffic with low security-sensitivity and high cost-sensitivity.

16. The network selection system of claim 12, wherein the traffic type determination unit is further configured to determine the traffic types based at least in part on an input from a user of the electronic device.

17. The network selection system of claim 12, wherein the traffic type determination unit is further configured to determine the traffic types based at least in part on a port used for the data traffic.

18. A non-transitory computer-readable storage medium having stored thereon computer-executable instructions that, in response to execution, cause a network selection system to perform operations, comprising:
determining types of two or more communication networks available for an electronic device by classifying the respective communication networks into two or more groups based at least in part on security levels and fee rates of the respective communication networks, wherein each of the two or more groups includes at least two communication networks;
determining a types of data traffics to be transmitted over the respective communication networks by classifying the respective data traffics into two or more groups based at least in part on security-sensitivity, cost-sensitivity of the respective data traffics, and an application running on the electronic device; and
determining the respective communication networks to be used for the respective data traffics based at least in part on the determined types of the communication networks and the determined types of the data traffics.

* * * * *

UNITED STATES PATENT AND TRADEMARK OFFICE
CERTIFICATE OF CORRECTION

| | | |
|---|---|---|
| PATENT NO. | : 9,066,225 B2 | Page 1 of 1 |
| APPLICATION NO. | : 13/989720 | |
| DATED | : June 23, 2015 | |
| INVENTOR(S) | : Lee | |

It is certified that error appears in the above-identified patent and that said Letters Patent is hereby corrected as shown below:

In the specification

In Column 1, Lines 6-7, delete "35 U.S.C. §371" and insert -- 35 U.S.C. § 371 --, therefor.

In the claims

In Column 14, Claim 18, Line 27, delete "a types" and insert -- types, --, therefor.

Signed and Sealed this
First Day of December, 2015

Michelle K. Lee
*Director of the United States Patent and Trademark Office*